Dec. 12, 1961 R. T. BUESING ET AL 3,013,215

TEMPERATURE CONTROLLED TRANSISTOR CIRCUIT

Filed June 16, 1959

*INVENTORS.*
RICHARD T. BUESING
WAYNE D. DALTON

*BY* Isidore Match
ATTORNEY

United States Patent Office 3,013,215

Patented Dec. 12, 1961

3,013,215

TEMPERATURE CONTROLLED TRANSISTOR CIRCUIT

Richard T. Buesing and Wayne D. Dalton, Lynchburg, Va., assignors to General Electric Company, a corporation of New York Filed June 16, 1959, Ser. No. 820,759

6 Claims. (Cl. 330—15)

This invention relates to circuit arrangements for providing protection against deleterious effects caused by excessive temperatures. More particularly, it relates to an arrangement which permits relatively high power transistor circuits to deliver substantially their maximum power to a load at relatively normal temperatures and automatically reduces the power delivered to the load and consequently the power dissipated in the circuit when temperatures are attained at which a transistor would be damaged.

It is well known that the junctions in transistors are subject to damage and even destruction if their operating temperatures are permitted to exceed a given level. Heretofore, it has been the general practice to provide high power transistor circuits utilizing bias circuits having temperature compensating components to limit the power delivered to a load to a safe value at high ambient temperatures. Such bias circuits, however, also limit the power at low ambient temperatures to such an extent that the transistor is rendered incapable of delivering maximum rated power.

Accordingly, it is an object of the present invention to provide a transistor circuit which is capable of delivering substantially maximum rated power at relatively normal ambient temperatures and wherein the transistors therein are protected from damaging effects due to high ambient temperatures.

It is another object to provide a relatively high power transistor circuit as in the preceding object which is capable of delivering maximum power at relatively normal ambient temperatures and in which the power is automatically reduced to a lower amount only at high temperatures.

Generally speaking and in accordance with the invention, there is provided in a transistor circuit which comprises a transistor having emitter, base and collector electrodes, means for decreasing the current flow in the transistor at a temperature exceeding a given level. The last named-means is responsive to the temperature at such level for automatically inserting an impedance in the circuit with the transistor to limit the current flow therein.

The features of this invention which are believed to be new are set forth with particularity in the appended claims. The invention itself, however, may best be understood by reference to the following description when taken in conjunction with the accompany drawing.

Figures 1, 2, 3, 4:
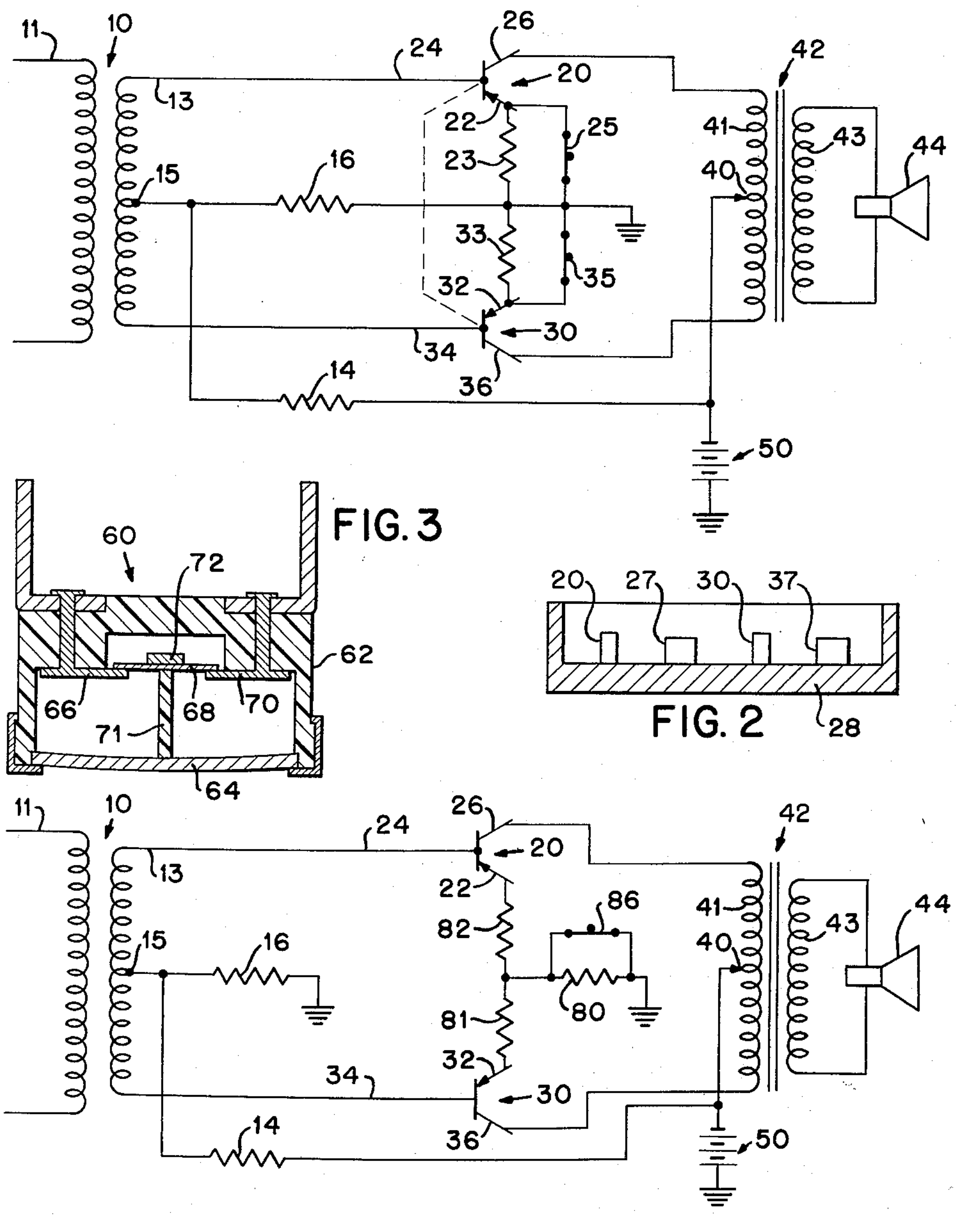
FIG. 1 is a schematic diagram of an embodiment in accordance with the principles of the invention.
FIG. 2 is a view, partly in section, which shows the disposition of the elements of the circuit of FIG. 1, on a heat sink.
FIG. 3 is a view of temperature sensitive means utilized in a circuit of FIG. 1 and shown mounted on the device of FIG. 2.
FIG. 4 shows another embodiment of a circuit in accordance with the principles of this invention.

Referring now to FIG. 1 there is shown therein a transistorized audio amplifier. It comprises a transistor 20 having an emitter electrode 22, a base electrode 24, and a collector electrode 26; and a transistor 30 which has an emitter electrode 32, a base electrode 34, and a collector electrode 36.

The output from the preceding stage (not shown) is applied to base electrodes 24 and 34 through a transformer 10 comprising a primary winding 11 and a secondary winding 13. Connected across collector electrodes 26 and 36 is the primary winding 41 of a transformer 42, the secondary winding 43 of which may be connected to a speaker 44 or other suitable load.

For providing proper biasing potentials to the electrodes of transistors 20 and 30, collector electrodes 26 and 36 are connected to the negative terminal of a unidirectional potential source 50, which may suitably be a battery, through a center tap 40 on winding 41. Base electrodes 24 and 34 are biased by their connection through a center tap 15 on winding 13 and a resistance 14 to the negative terminal of source 50, center tap 15 also being connected to ground through a resistance 16.

Emitters 22 and 32 are connected to ground respectively through resistances 23 and 33 respectively.

Shunting resistances 23 and 33 are the contacts of thermostats which are of the snap action type. Such thermostats comprise a bimetallic disk element and contacts spaced therefrom which are normally closed below a given temperature and which snap open when such given temperature is exceeded. The dashed line between electrodes 24 and 34 is included in the diagram of FIG. 1 to indicate that transistors 20 and 30 are mounted upon a heat sink.

In FIG. 2, heat sink 28 which in addition may serve as the chassis and housing for the circuit elements of FIG. 1, essentially serves as a heat radiating member for dissipating the heat generated in transistors 20 and 30 during their operation thereby to aid in maintaining more uniform temperature of the devices mounted thereon. The transistors are mounted on the heat sink as are the bimetallic temperature sensitive elements of the snap action thermostats. Thus, the contacts 25 and 35 of thermostats 27 and 37 respectively open when the temperature of heat sink 28 exceeds the level at which thermostats 27 and 37 are chosen to operate.

In FIG. 3, there is shown in section a simplified diagram of a thermostat which may be advantageously used in accordance with the present invention. The thermostat 60 comprises a housing 62 which may consist of a suitable insulating material such as a suitable plastic. Contained in one end of housing 62 is a bimetallic element 64 in the form of dish shaped disk which is normally concave below a certain temperature. A set of contacts such as designated by the numerals 25 and 35 in the circuit of FIG. 1, comprise contacts 66, 68 and 70. An insulating post 71, known as a "pusher" is disposed between bimetallic element 64 and contact 68, contact 68 bearing against a spring 72.

In the operation of the thermostat of FIG. 3, below a chosen temperature, bimetallic element 64 maintains its concave disposition. When such chosen temperature is attained and then exceeded element 64 assumes the convex disposition with the consequent causing of post 71 to separate contact 68 from contacts 66 and 70, contact 68 bearing against the tensioning action of spring 72. A suitable temperature at which bimetallic element 64 changes from the concave to the convex disposition may be at about 75° C.

Considering now the operation of the circuit of FIG. 1, at the temperature below which bimetallic element 64 remains in its concave disposition, the thermostat contacts are closed and emitters 22 and 32 are connected directly to ground therethrough. Thus, below this temperature maximum emitter current is permitted to flow and maximum power is delivered to load 44 through transformer 42. When the heat sink upon which the transistors and the thermostats are mounted attains the temperature at which the thermostats snap, i.e., when their contacts open, emitters 22 and 32 are connected to ground through resistors 23 and 33 respectively whereby the emitter current in each of the transistors is decreased. The values of resistors 23 and 33 are so chosen that the current permitted to flow in the transistors above the temperatures that contacts 25 and 35 open is not sufficient to damage the junctions in transistors 20 and 30.

The circuit depicted in FIG. 4 is substantially the same as that in FIG. 1 so that like elements have been designated with the same numerals. The difference between the circuit of FIG. 4 and FIG. 1 is the presence of an added resistor 80 between the junction of emitter resistors 82 and 81 and ground. By this arrangement, the emitter electrodes are not directly connected to ground as in the circuit of FIG. 1 below a chosen temperature but the junction of their resistors is so connected by the parallel arrangement of the resistor 80 and the thermostat contacts 86. With the latter circuit configuration, there is eliminated the possibility of the occurrence of a sudden imbalance if the contacts of one thermostat opened substantially in advance of the other thermostat. Of course, the values of resistors 23 and 33 of FIG. 1 respectively exceed the values of resistors 82 and 81 appreciably since resistors 82 and 81 are always in the circuit, no matter what the temperature of the heat sink.

It is, of course, to be understood that although the embodiments of this invention as shown in FIGS. 1 and 4 and described hereinabove comprise means for decreasing current in a transistor by switching a resistor into circuit with an emitter electrode in response to a chosen level of temperature, the principles of the invention may also be accomplished by a like arrangement wherein the resistor is switched into circuit with the base or collector electrode in response to the chosen temperature level.

While there have been shown and described particular embodiments of this invention, it is apparent that other forms and embodiments may be made and it is contemplated in the claims to cover any such modifications as fall within the spirit and scope of the invention.

What is claimed is:

1. In a transistor circuit comprising a pair of transistors, each of said transistors having emitter, base and collector electrodes respectively, a source of potential for providing proper biasing voltage to said electrodes, said transistor being mounted on a heat sink, means for maintaining the power output of said transistors at a substantially maximum rated level below a given temperature and for decreasing the power output of said transistors at a temperature exceeding said level comprising temperature regulating means mounted on said heat sink, said means comprising a temperature sensitive element in contact with said heat sink and contacts associated with said element which are normally closed below a given temperature level and which open at a temperature exceeding said level, each of said emitter electrodes being connected to said source through a parallel arrangement of a resistance and said contacts whereby said emitter electrodes are directly connected to said source through said contacts at a temperature below said level and are connected to said source through said respective resistances at a temperature exceeding said level.

2. In a transistor circuit comprising a pair of transistors having emitter, base and collector electrodes respectively, said transistors being connected in the grounded emitter configuration and being mounted on a heat sink, means for permitting maximum current to flow in said transistors at temperatures below a given level and for automatically decreasing the current flow in said transistors at a temperature above said level comprising a plurality of snap action thermostats mounted on said heat sink, said thermostats comprising respectively a bimetallic element on said heat sink and contacts associated with and spaced from said element, said contacts normally being in the closed position at a temperature below a chosen level and opening at a temperature exceeding said level, said emitters being connected to ground through respective parallel combinations of a resistance and a set of thermostat contacts whereby at a temperature below said given level said emitters are directly connected to ground through said contacts and whereby at a temperature exceeding said level, said emitters are connected to ground respectively through said resistances.

3. In a transistor circuit comprising a pair of transistors having respectively emitter, base and collector electrodes, said transistors being arranged in the common emitter transfiguration and mounted on a heat sink, means for maintaining the current flow through said transistors at a first higher level below a given temperature and for automatically decreasing said current flow at a temperature exceeding said given temperature comprising temperature sensitive means mounted on said heat sink, said temperature sensitive means comprising a bimetallic element on said heat sink and contacts associated with and spaced therefrom, said contacts normally assuming the closed position at a temperature below said given temperature and opening at a temperature exceeding said given temperature, said emitters being connected to ground through a parallel combination of a resistance and a set of said contacts, said contacts opening at temperatures exceeding said given temperature to insert said resistance in circuit with said emitters whereby the current in said transistors is cause to decrease.

4. In a transistor circuit as defined in claim 3 wherein there are further included a voltage divider comprising a pair of resistances connected between said emitters and wherein the junction point of said resistances in said divider is connected to ground through said parallel combination of said resistance and said thermostat contacts.

5. In a transistor circuit which is protected from damage due to excessive power dissipation induced by high operating temperatures, the combination comprising a transistor having emitter, base and collector electrodes, temperature sensitive means for decreasing the current flow in said transistor only when the temperature exceeds a given level including resistance means coupled to one of said electrodes, temperature sensitive switch means coupled across at least a portion of said resistance means to bypass said portion at temperatures below said given temperature level and being actuated to insert said resistance means at temperatures above said temperature level.

6. In a temperature protected transistor circuit the combination comprising a transistor having emitter, base and collector electrodes, a source of potential for biasing said electrodes and establishing their respective operating conditions, means for decreasing the current flow in said transistor at a temperature exceeding a given level, said last named means comprising resistance means connected to said emitter electrode, temperature switch means for shorting out said resistance means and maintaining said emitter electrode directly connected to said source at temperatures below said level, said switch means being actuated at temperatures exceeding said level for incrementally inserting a resistance between said emitter and said source.

References Cited in the file of this patent

UNITED STATES PATENTS

| | | |
|---|---|---|
| 1,873,837 | Gebhard | Aug. 23, 1932 |
| 2,530,935 | Bock | Nov. 21, 1950 |
| 2,680,160 | Yaeger | June 1, 1954 |
| 2,761,917 | Aronson | Sept. 4, 1956 |

OTHER REFERENCES

Mullard: "Transistor Base-to-Emitter Voltage Compensation," Wireless World, August 1957, page 98 (advertisement).